United States Patent [19]
Feibus

[11] Patent Number: 5,685,257
[45] Date of Patent: Nov. 11, 1997

[54] PET SUPPORT CUSHION

[76] Inventor: Miriam Feibus, 6240 Park South Dr., Charlotte, N.C. 28210

[21] Appl. No.: 597,393

[22] Filed: Feb. 8, 1996

[51] Int. Cl.$^6$ .................................................. A01K 29/00
[52] U.S. Cl. .......................... 119/28.5; 5/484; 5/652
[58] Field of Search ..................... 119/28.5, 169, 119/526; 5/502, 690, 484, 707, 653, 655, 500, 652

[56] References Cited

U.S. PATENT DOCUMENTS

| | | | |
|---|---|---|---|
| 3,761,973 | 10/1973 | Leventhal | 5/335 |
| 3,902,456 | 9/1975 | David | 119/1 |
| 4,614,000 | 9/1986 | Mayer | 5/484 |
| 4,649,861 | 3/1987 | Elkins et al. | 119/1 |
| 4,777,681 | 10/1988 | Luck et al. | 5/464 |
| 4,856,299 | 8/1989 | Bryant | 62/202 |
| 4,961,982 | 10/1990 | Taylor | 428/41 |
| 5,002,014 | 3/1991 | Albin | 119/1 |
| 5,136,981 | 8/1992 | Barreto, III et al. | 119/28.5 |
| 5,144,911 | 9/1992 | Moore et al. | 119/28.5 |
| 5,226,384 | 7/1993 | Jordan | 119/28.5 |
| 5,249,320 | 10/1993 | Moretz et al. | 5/484 |
| 5,363,804 | 11/1994 | McAlister | 119/25.5 |

*Primary Examiner*—Edgar S. Burr
*Assistant Examiner*—Dave Ghatt
*Attorney, Agent, or Firm*—Shefte, Pinckney & Sawyer

[57] ABSTRACT

A cushion for supporting humans and animals, particularly domestic pets, includes a plurality of layers including a layer of absorbent and anti-static material providing a cover, a first intermediate layer formed from an absorbent material, a second intermediate layer formed from polyester fill material, and a fluid impermeable inner layer having a plurality of cushioning elements formed therein. The pet bed of the present invention is stain-resistant, washable, hypoallergenic and non-toxic.

14 Claims, 3 Drawing Sheets

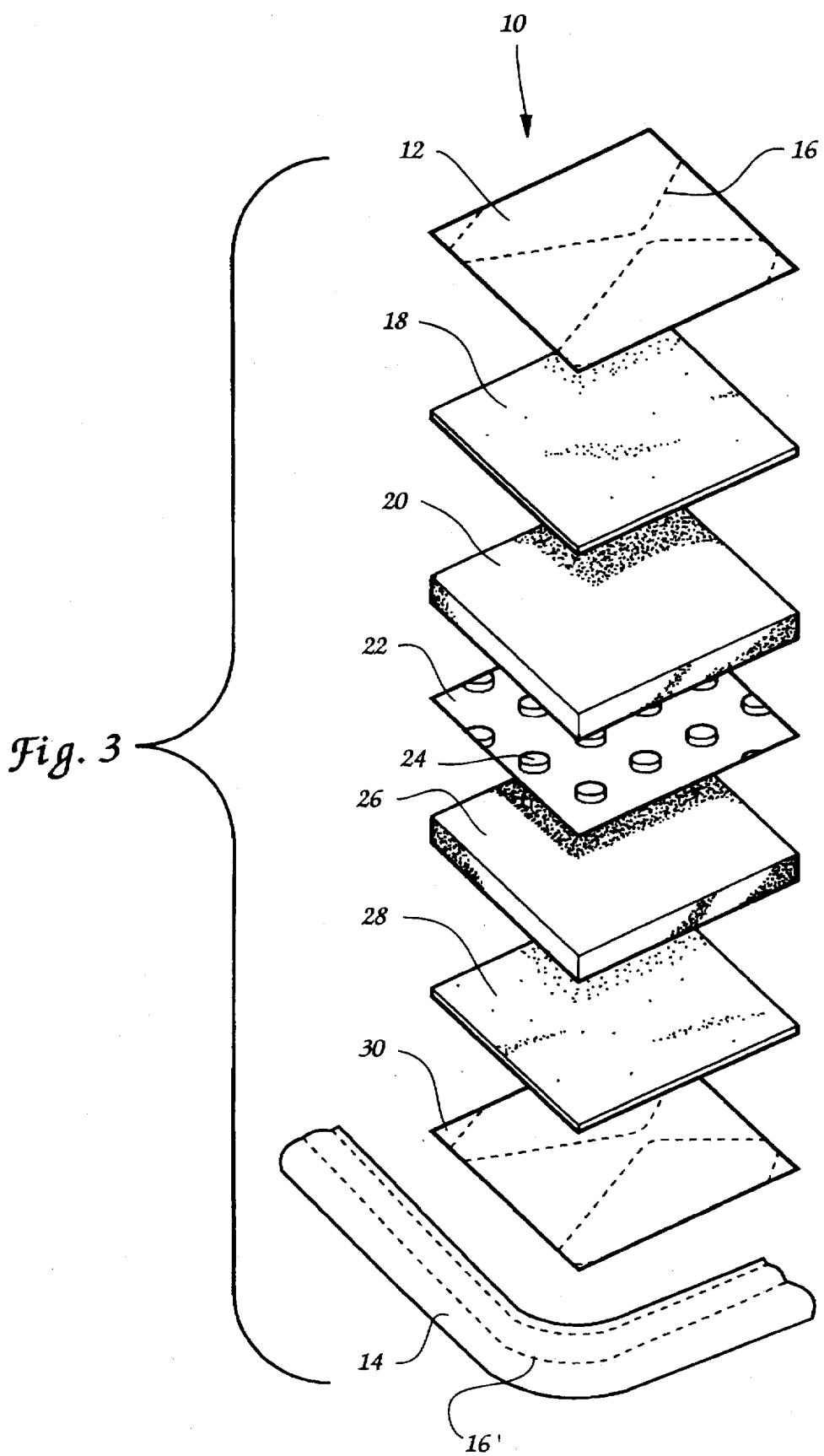

PET SUPPORT CUSHION

BACKGROUND OF THE INVENTION

The present invention relates broadly to pillows, cushions, futons and other stuffed support cushions and, more particularly, to a support a cushion for humans and, especially, domestic pets which is formed from a plurality of discrete layers.

Simple rectangular or oval cushions are commonplace among pet owners and are used to provide a bed or rest support cushion for the pet. These relatively thin support cushions are used primarily by dog owners but they may be used to sport other domestic pets as well. As may be imagined, the pet beds are subject to staining from animal fluids and are subject to being chewed by the pet. Further, such pet beds are typically easily soiled from encounters with outdoor pets.

Such pet beds may be formed of layers of different material to incorporate the desirable characteristics of each type of material. For example, Elkins et al U.S. Pat. No. 4,649,861 is directed to a pet mat having a top layer, a bottom layer and an intermediate layer. The top layer is formed from an insect pervious material such as spunbonded polyester scrim, to allow insects such a fleas and ticks to travel into the intermediate layer. The intermediate layer is formed from an open cell material such as urethane foam and a wet or slow drying adhesive is provided which may be mixed with bait to attract fleas. Once the insects or fleas touch the adhesive they will be retained and separated from the pet on the mat by the outer layer. The Elkins et al pet mat has a specific use, namely, to help prevent pets from becoming flea infested.

U.S. Pat. No. 5,226,384 to Jordan is another example of a layered pet bed which is pest resistant. Preferably, the Jordan cover is formed of from an aramid sheet laminated to a polyester sheet. The core of the bed is preferably made of polymeric foam, or other relatively soft material. The durability of the outer cover makes the Jordan pet bed highly resistant to destructive activities of the animal as well as to pest infestation.

The prior art pet beds, however, fail to provide an instantly absorbent, anti-static, lint-free, non-toxic and hypoallergenic pet bed which is resistant to animal destruction, is resistant to stains, can be easily laundered, and may be easily and thoroughly cleaned. Such a cushion would be useful in an environment where it is intended to be reused by different animals, such as a veterinarian's office or pet shop and provides the home pet owner with a support cushion that can easily be kept substantially clean.

SUMMARY OF THE INVENTION

It is accordingly an object of the present invention to provide a pet support cushion which is formed from a plurality of layers of discrete material to provide a pet support cushion which is absorbent, static dissipating, lint-free, non-toxic and hypoallergenic. It is another object of the present invention to provide such a pet support cushion which may be easily laundered and resists staining.

It is another object of the present invention to provide such a pet support cushion which resists animal destruction by having a high tear strength in either direction.

It is yet another object of the present invention to provide a pet support cushion which provides a resilient cushion for pets which can be inverted should one side become wet or otherwise soiled without full permeation of the pet support cushion.

To that end, a support cushion for humans and animals includes a body formed from a plurality of layers including a first outer covering layer formed from at least one sheet of textile material; a first intermediate layer disposed closely adjacent the first covering layer and formed from at least one sheet of absorbent material; a second intermediate layer closely adjacent the first intermediate layer and formed from flexible sheet material: and an inner layer disposed closely adjacent the second intermediate layer and formed from a fluid impermeable resilient sheet material. Further, a third intermediate layer is disposed closely adjacent the inner layer and is formed similarly to the second intermediate layer. A fourth intermediate layer is disposed closely adjacent the third intermediate layer and is formed similarly to the first intermediate layer. Finally, a second outer covering layer is disposed closely adjacent the fourth intermediate layer and is formed similarly to the first covering layer. All of the layers are retained together to form the cushion body.

It is preferred that the cushion further include a binding extending around all the layers and being stitched to the first and second covering layers. It is further preferred that the first and fourth intermediate layers are formed from an absorbent polypropylene material. Preferably, the second and third intermediate layers are formed from polyester sheet material.

The inner layer may be formed from a plastic sheet having a plurality of covered fluid-filled cavities formed therein. Preferably, the covering layer is formed from an absorbent, static-dissipating, non-toxic and hypoallergenic material. It is preferred that the covering be formed from CONSORB®, a textile material which is primarily used as a reusable surgical towel. CONSORB® is an anti-static and absorbent fabric which is the subject of U.S. Pat. No. 4,856,299 to Bryant and is owned by Conductex Incorporated, a corporation controlled by the applicant.

It is preferred that the binding be formed of CONSORB® fabric and the binding is stitched to the inner layer to retard relative movement between the inner layer and the intermediate layers. Further, the cushion body includes at least two side portions joined to at least two ends portions forming at least four side and end junctions to define a continuous body with the side and end junctions being rounded.

By the above, the present invention provides a pet bed that is absorbent, can be easily cleaned, is non-toxic and hyperallergenic, will not retain stains and which resists tearing.

BRIEF DESCRIPTION OF THE DRAWINGS

FIG. 3 is an exploded view of the support cushion illustrated in FIG. 1.

DETAILED DESCRIPTION OF THE PREFERRED EMBODIMENT

Figure 1:
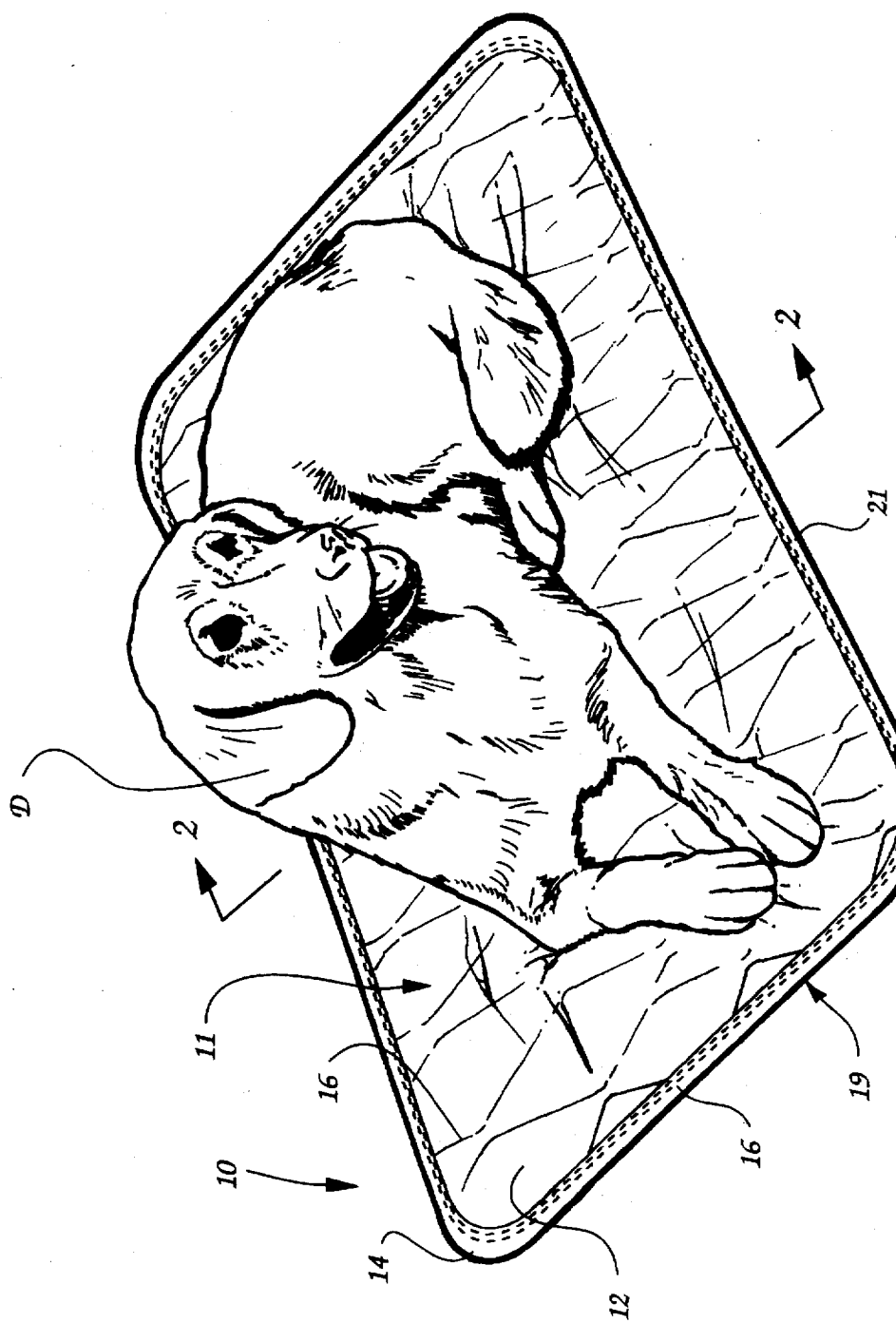
FIG. 1 is a perspective view of a support cushion for humans and animals, particularly domestic pets, according to the preferred embodiment of the present invention.

Turning now to the drawings and, more particularly, to FIG. 1, a support cushion for humans and animals, and, more particularly, domestic pets, is illustrated generally at 10 and is formed as a generally rectangular body 11 having a cover 12 fastened to a binding 14 by stitches 16. The cushion 10 includes two elongate end portions 21 joined with two elongate side portions 19 at the corners 17. The corners 17 are rounded to reduce the motivation of a dog, such as that illustrated at D, to chew the corners 17 of the cushion 10. The cushion 10 is relatively thin compared to the length of the end portions 19 and the side portions 21.

Figure 2:
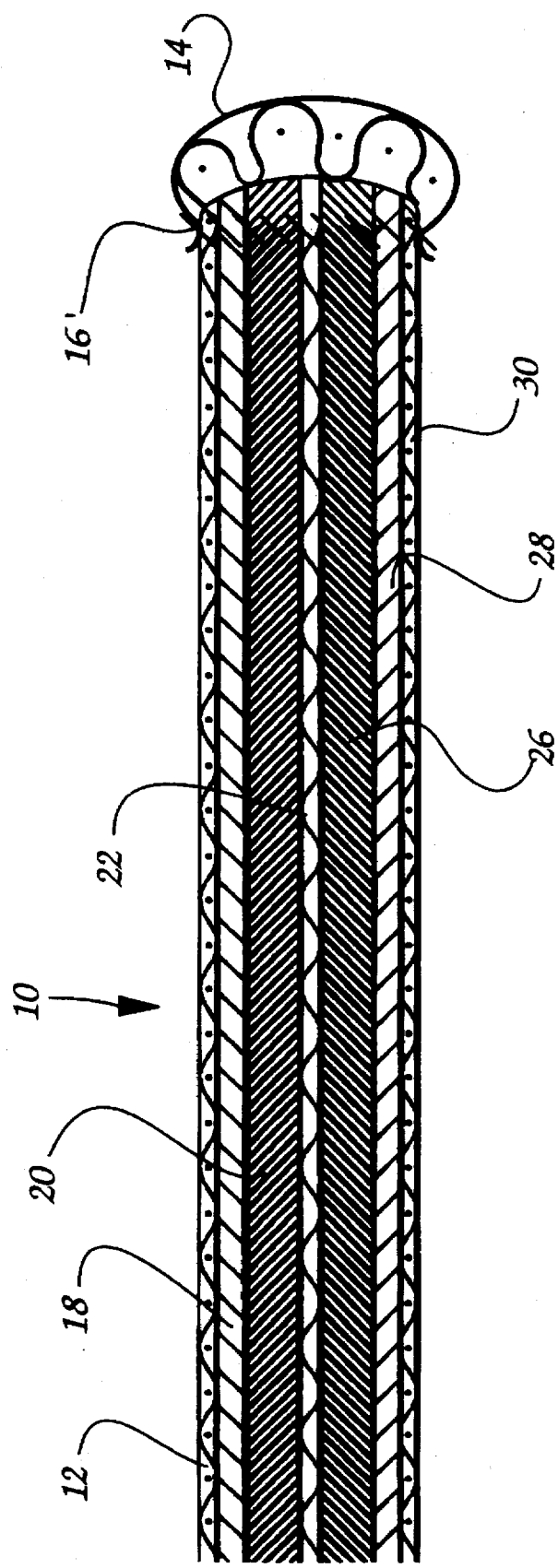
FIG. 2 is a cross-sectional view of the support cushion illustrated in FIG. 1 taken along lines 2—2 thereof.

The binding 14 and cover 12,30 as seen in FIGS. 2 and 3, are formed from CONSORB® anti-static and absorbent fabric which, as previously noted, is the subject of U.S. Pat. No. 4,856,299 to Bryant. The anti-static and absorbent fabric is also resistant to the adherence of stains and is highly resistant to breakage or tearing in any direction. Further, the fabric has improved electrical charge dissipation, is anti-pilling and anti-linting. The absorbent and anti-static fabric preferred as a cover and binding for the cushion of the present invention enhances the utility of the present invention in a veterinary setting where such a pad would be washed and rewashed several times over its life span and would need to be resistant to the adherence of stains, including blood. The fabric is also hypoallergenic and may be conventionally laundered.

As seen in FIGS. 2 and 3, the cushion of the present invention is formed from a plurality of layers which are retained in a closely adjacent relationship with each layer being formed of sheet material. Each layer is generally rectangular and extends the full width and breadth of the cushion body 11. The present invention includes an outer cover layer 12 which is disposed closely adjacent a first intermediate layer 18. The first intermediate layer 18 is formed from an absorbent, polypropylene material, preferably of a foam nature. Following in succession inwardly toward the center of the cushion 10, a second intermediate layer 20 is disposed closely adjacent the first intermediate layer 18. The second intermediate layer 20 is formed from a polyester staple fill material, preferably some form of batting, to provide loft and cushioning to the cushion.

An inner layer 22 is disposed closely adjacent the second intermediate layer 20. The inner layer 22 is formed form a fluid impermeable sheet, preferably plastic, having a plurality of covered, fluid-filled cavities 24 extending in a predetermined pattern across the plastic sheet. Preferably, the fluid is air and the fluid-filled cavities act as individual spring-like elements to provide enhanced cushioning. Since the inner layer 22 is fluid-impermeable, fluids which enter the cushion through the first outer layer 12 are blocked from seeping through to the second outer layer 30, and vice versa. Therefore, if the cushion 10 is wetted on one side, it will remain dry on the other side.

A third intermediate layer 26 is formed similarly to the second intermediate layer 20 and is disposed closely adjacent the inner layer 22. This places the inner layer 22 intermediate two similar layers of polyester fill material 20,26.

A fourth intermediate layer 28 is disposed closely adjacent the third intermediate layer 26 and is formed from an absorbent, polypropylene material, similar to the material from which the first intermediate layer 18 is formed. Finally, a second covering layer 30 is disposed closely adjacent the fourth intermediate layer 28 and is formed from the material which comprises the first cover 12. This construction provides a reversible cushion 10 which presents an identical structure from inner layer 22 to cover 12,30 in either direction.

As previously mentioned, a binding 14 is provided which extends around the end portions 19 and the side portions 21 of the cushion 10. Preferably, and as seen in FIG. 2, all layers are stitched together using stitches 16' which extend around the cushion 10 in the area of the binding 14. This stitching 16' retains the layers against one another and acts to reduce relative movement between the layers. Among other desirable results, this feature allows the cushion to withstand repeated washings. Optionally, stitching 16 is provided across the covers 12,30 to provide a quilted effect to the outer surface of the cushion 10. It should be understood by those skilled in the art that the cushion 10 of the present invention may be formed with the covers 12,30 formed from a single sheet folded in half without departing from the spirit and scope of the present invention. Similarly, the first intermediate layer 18 and the fourth intermediate layer 28 may be a single folded sheet and the second intermediate layer 20 and the third intermediate layer 26 may be single folded sheets, all stitched together. As may be expected, any combination of the above covers 12,30 and layers 18,20,26, 28 may be single folded sheets as discussed above.

In operation, the cushion 10 of the present invention can be placed on the floor or other support object and may support a dog D, as seen in FIG. 1 or other domestic pet thereon. After use, the pad may be washed in a conventional manner and, when the cushion 10 is removed from the water a buffing pad, such as a plastic randomly woven scrubbing pad may be used to scrape the surface of the cushion 10 to remove lingering pet hairs. Further, the cushion 10 may be used for children, as well as pets, and is particularly useful in a veterinary setting.

The present cushion provides many advantages. The cushion 10 can be rolled up for travel and storage and can be secured in a rolled condition with a strap (not shown) which may be used as a carrying handle. Further, the cushion 10 has an inherent firmness which allows an arthritic dog to rise from the cushion easier than with other, beanbag-type pads or mats. Due to the materials used in the cushion 10 of the present invention, it can be sterilized and used as an operating table pad by veterinarians. The static dissipating nature of the cover reduces the hazards associated with a pet causing a static electrical discharge. Finally, the fabric will "breathe," thereby providing a measure of odor resistance and the fabric is fire retardant. By the above, the present invention provides a unique and versatile pet support cushion.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A support cushion for humans and animals comprising a body formed from a plurality of layers including:
   a first covering layer formed from at least one sheet of textile material;
   a first intermediate layer disposed closely adjacent said first covering layer and formed from at least one sheet of absorbent material;

a second intermediate layer disposed closely adjacent said first intermediate layer and formed from at least one sheet of flexible material;

an inner layer disposed closely adjacent said second intermediate layer and formed from fluid impermeable resilient sheet material, a third intermediate layer disposed closely adjacent said inner layer and formed from at least one sheet of flexible material;

a fourth intermediate layer disposed closely adjacent said third intermediate layer and formed from at least one sheet of absorbent material; and a second covering layer disposed closely adjacent said fourth intermediate layer and formed from at least one sheet of textile material, all said layers being retained together to form said cushion body.

2. A support cushion according to claim 1 and further comprising a binding extending around all said layers and being stitched to at least said first and second covering layers.

3. A support cushion according to claim 1, wherein said first and fourth intermediate layers are formed from an absorbent polypropylene material.

4. A support cushion according to claim 1, wherein said second and third intermediate layers are formed from polyester textile sheet material.

5. A support cushion according to claim 1, wherein said inner layer is formed from a plastic sheet having a plurality of covered fluid filled cavities formed therein.

6. A support cushion according to claim 1, wherein said covering layer is formed from an absorbent, static-dissipating, non-toxic and hypoallergenic material.

7. A support cushion according to claim 2, wherein said binding is stitched to said inner layer to retard relative movement between said inner layer and said intermediate layer.

8. A support cushion according to claim 2, wherein said cushion body includes at least two side portions joined to at least two end portions forming at least four side and end junctions to define a continuous body, said side and end junctions being rounded.

9. A support cushion for domestic pets comprising a body formed from a plurality of layers including:

a first covering layer formed from at least one sheet of absorbent, static-dissipating, non-toxic hypoallergenic material;

a first intermediate layer disposed closely adjacent said first covering layer and formed from at least one sheet of absorbent polypropylene material;

a second intermediate layer disposed closely adjacent said first intermediate layer and formed from at least one polyester textile sheet;

an inner layer closely adjacent said second intermediate layer and formed from fluid impermeable plastic sheet material having a plurality of covered fluid filled cavities formed therein, said covered cavities forming a plurality of resilient elements;

a third intermediate layer disposed closely adjacent said inner layer and formed from a material substantially similar to the material from which said second intermediate layer is formed;

a fourth intermediate layer disposed closely adjacent said third intermediate layer and formed from a material substantially similar to that from which said first intermediate layer is formed; and a second covering layer disposed closely adjacent said fourth intermediate layer and formed from a material substantially similar to that from which said first covering layer is formed, all said layers being joined together to form said cushion body.

10. A support cushion according to claim 9 and further comprising a binding extending around all said layers and being stitched to said first and second covering layers.

11. A support cushion according to claim 10, wherein said cushion body includes at least two side portions joined to at least two end portions forming at least four side and end junctions to define continuous body, said side and end junctions being rounded.

12. A support cushion according to claim 9, wherein said covering layer is formed from an absorbent, static-dissipating non-toxic and hypoallergenic material.

13. A support cushion according to claim 12, wherein a binding is stitched to said inner layer to retard relative movement between said inner layer and said intermediate layer.

14. A support cushion according to claim 10, wherein said first covering layer, said second covering layer and said binding are all formed from an absorbent static-dissipating, non-toxic and hypoallergenic sheet material.

* * * * *